United States Patent [19]

Cross et al.

[11] Patent Number: 4,757,431
[45] Date of Patent: Jul. 12, 1988

[54] OFF-AXIS APPLICATION OF CONCAVE SPHERICAL REFLECTORS AS CONDENSING AND COLLECTING OPTICS

[75] Inventors: David B. Cross, Los Angeles; Seiji Inatsugu, Santa Monica, both of Calif.

[73] Assignee: Laser Media, Los Angeles, Calif.

[21] Appl. No.: 880,794

[22] Filed: Jul. 1, 1986

[51] Int. Cl.[4] ............................................. F21V 7/00
[52] U.S. Cl. ...................... 362/261; 362/296; 362/263; 356/73.1
[58] Field of Search ................ 362/16, 18, 261, 263, 362/268, 282, 296, 32, 293; 356/73.1

[56] References Cited

U.S. PATENT DOCUMENTS

| | | | |
|---|---|---|---|
| 3,103,574 | 9/1963 | Chellis et al. | 362/261 |
| 3,122,330 | 2/1964 | Trentini | 362/261 |
| 3,225,188 | 12/1965 | Le Vantine | 362/304 |
| 3,712,979 | 1/1973 | Padgitt | 362/296 |
| 3,798,441 | 3/1974 | Wilson | 362/261 |
| 3,988,626 | 10/1976 | Boudouris | 313/113 |
| 4,206,494 | 6/1980 | Lovering | 362/263 |
| 4,281,267 | 7/1981 | Johnson | 313/25 |
| 4,454,570 | 6/1984 | Morello | 362/293 |
| 4,535,394 | 8/1985 | Dugre | 362/293 |

FOREIGN PATENT DOCUMENTS

| | | | |
|---|---|---|---|
| 1383413 | 11/1964 | France | 362/32 |
| 2159940 | 12/1985 | United Kingdom | 356/73.1 |

*Primary Examiner*—Charles J. Myhre
*Assistant Examiner*—David A. Okonsky
*Attorney, Agent, or Firm*—Blakely, Sokoloff, Taylor & Zafman

[57] ABSTRACT

A portion of a nearly spherical reflector is used to direct the electromagnetic radiation onto a small target. The electromagnetic radiation source is displaced from the optical axis of the reflector to maximize flux density at the target with minimal distortion. The present invention is particularly suited to coupling light from an arc lamp into an optic fiber.

9 Claims, 6 Drawing Sheets

CONDENSER LENSES WITH A REAR REFLECTOR

ELLIPSOIDAL REFLECTOR ARRANGEMENT

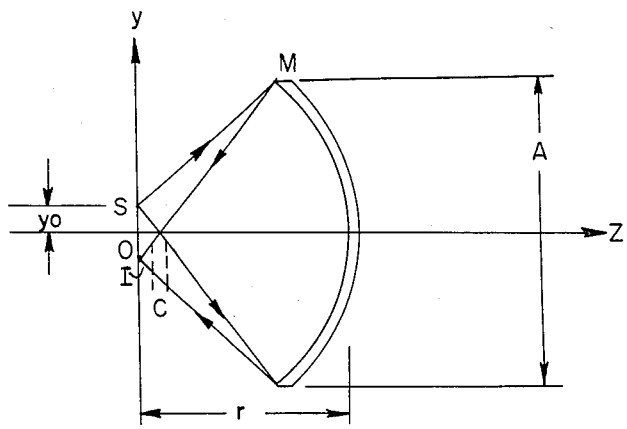

FIG. 3a SCHEMATIC ARRANGEMENT SHOWN IN Y-Z PLANE

S- POINT SOURCE
I- IMAGE OF THE POINT SOURCE
M- SPHERICAL REFLECTOR
C- CORRECTING OPTICAL ELEMENT
O- THE CENTER OF THE SPHERE COINCIDES WITH THE ORIGIN
    OF THE COORDINATE SYSTEM (X,Y,Z)
r- RADIUS OF CURVATURE OF THE SPHERICAL SURFACE
A- DIAMETER OF THE APERTURE OF THE SPHERICAL SURFACE
yo- THE SEPARATION DISTANCE OF THE SOURCE MEASURED
    FROM THE OPTICAL AXIS

NOTES- MAGNETIC FIELD IS NOT SHOWN

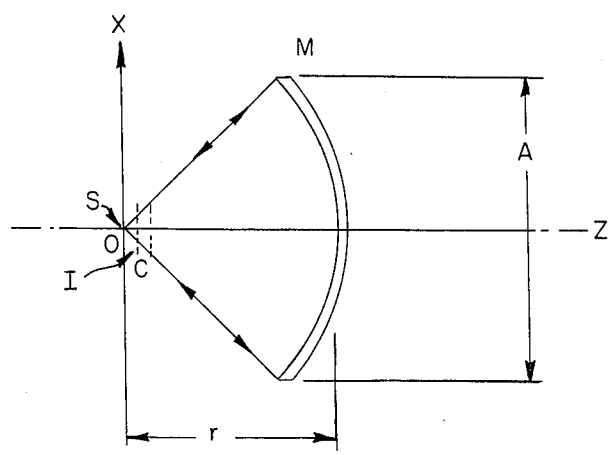

FIG. 3b SCHEMATIC ARRANGEMENT SHOWN IN X-Z PLANE

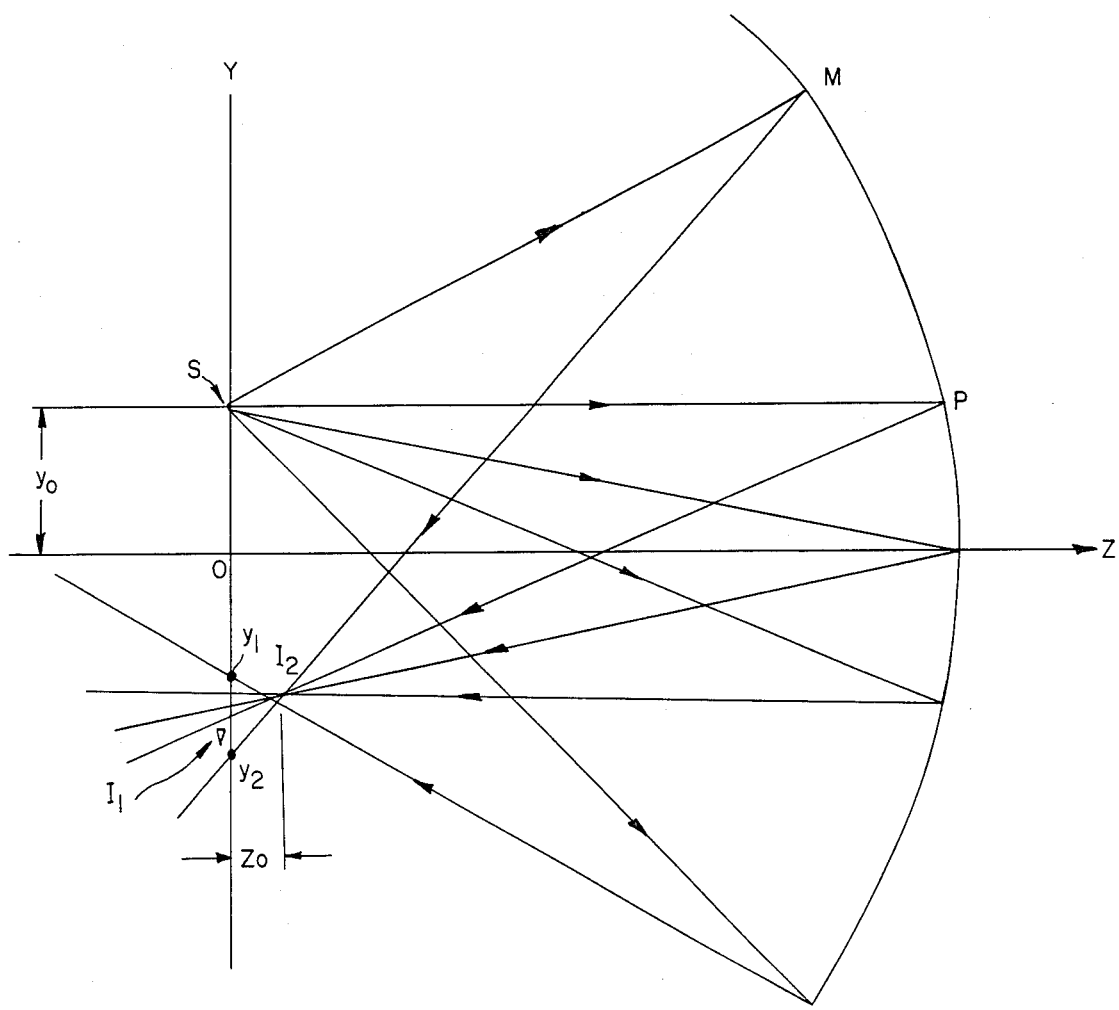
FIG. 4 BEHAVIOUR OF RAYS IN THE Y-Z PLANE
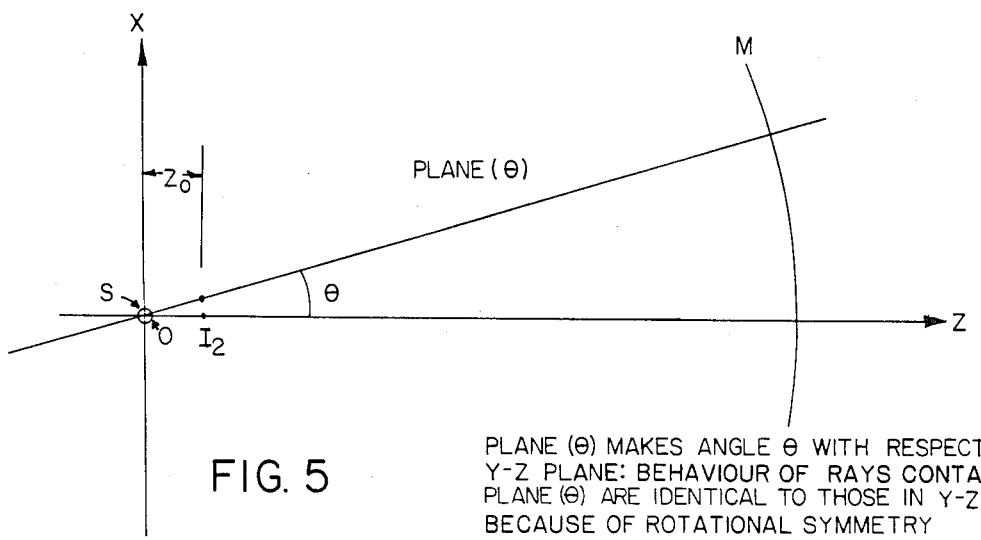
FIG. 5
PLANE ($\Theta$) MAKES ANGLE $\Theta$ WITH RESPECT TO Y-Z PLANE: BEHAVIOUR OF RAYS CONTAINED IN PLANE ($\Theta$) ARE IDENTICAL TO THOSE IN Y-Z PLANE BECAUSE OF ROTATIONAL SYMMETRY

DETAIL OF FOCAL POINT $B = 2a$
$Zo = yo \sin B$

REFLECTION OF PARAXIAL RAY DEFINES THE FOCAL LOCATION ($I_2$) AND Zo

OFF-AXIS APPLICATION OF CONCAVE SPHERICAL REFLECTORS AS CONDENSING AND COLLECTING OPTICS

FIELD OF THE INVENTION

The present invention relates to collecting and condensing systems for electromagnetic radiation. Such systems typically may include a light source and collecting and condensing optics.

BACKGROUND OF THE INVENTION

Conventional collecting and condensing designs for electromagnetic radiation emphasize collecting and redirecting the maximum amount of light from a single point source radiating isotropically; in doing so, the ability of these designs to concentrate radiation flux into a small spot size is compromised. Adapting these designs to produce a small spot size results in a decrease in radiation flux because the emphasis of conventional designs (i.e. the collection and redirection of the maximum amount of light) conflicts with the goal of concentrating the light flux into the smallest possible spot size when the light originates from conventional incoherent light sources. Thus, small spot size images may be obtained only with a penalty in decreased flux density.

Currently two collecting and condensing designs are used. The first is a system of condenser lenses (See FIG. 1). Condenser lenses have several problems, including the creation of chromatic and spherical aberrations, the high cost of corrected optics, the inherent difficulty in aligning the lenses and the large amount of space the system demands. Ellipsoidal reflectors (FIG. 2.) are also used. Their problems include high cost and the unavoidable magnification of the image which reduces the flux density at the image. Both of these systems (FIGS. 1 and 2) tend to emphasize the collection and redirection of the maximum amount of light from a single point source. Thus, they fail to optimize both spot size and light density.

The invention optimizes these two fundamental optical characteristics to wit: spot size and energy. The invention is particularly useful where a small target (e.g. an optical fiber) needs to be illuminated with the highest possible density. For example, the invention may be used to couple a large amount of light from an arc lamp into a small single core optical fiber. Although similar results may be obtained by means of a conventional optical condenser arrangement, there are certain drawbacks of complexity and cost that are associated with such a conventional approach.

SUMMARY OF THE INVENTION

The present invention uses a novel application of a concave reflector with a shape substantially like a portion of a sphere to produce a high flux density image on a small target. A source of either coherent or incoherent electromagnetic radiation is placed in front of the concave reflector at an off-axis position. That is, the source of radiation is positioned off the axis of symmetry of the concave reflector. The axis of symmetry of the concave reflector is often referred to as the optical axis. The present invention is simple, compact, inexpensive and easy to align in comparison to the prior art.

BRIEF DESCRIPTION OF THE DRAWINGS

FIG. 3a is a schematic cross sectional view of the present invention in the y-z plane. As shown in FIG. 3a, the z axis is the optical axis (and axis of symmetry) of the reflector M.

FIG. 3b is a schematic cross sectional view of the present invention in the x-z plane.

FIG. 4 is an enlarged view of FIG. 3a in the form of a ray diagram, showing the image area in greater detail.

FIG. 5 is an enlarged view of FIG. 3b showing the location of a plane $\theta$ to illustrate rotational symmetry.

FIG. 6 is in the form of a ray diagram.

DETAILED DESCRIPTION OF THE INVENTION

Figure 1:
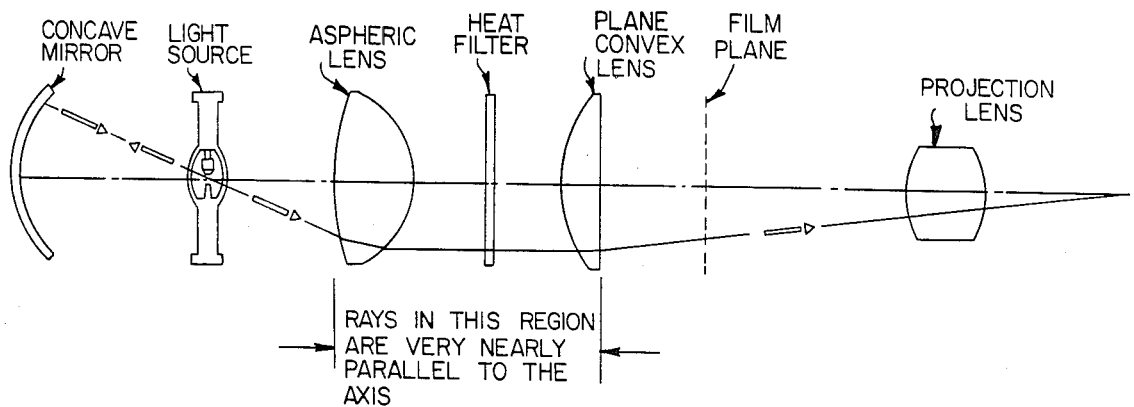
FIG. 1 ("FIG. 1") is a schematic view of a condenser lens system under the prior art.
Figure 2:
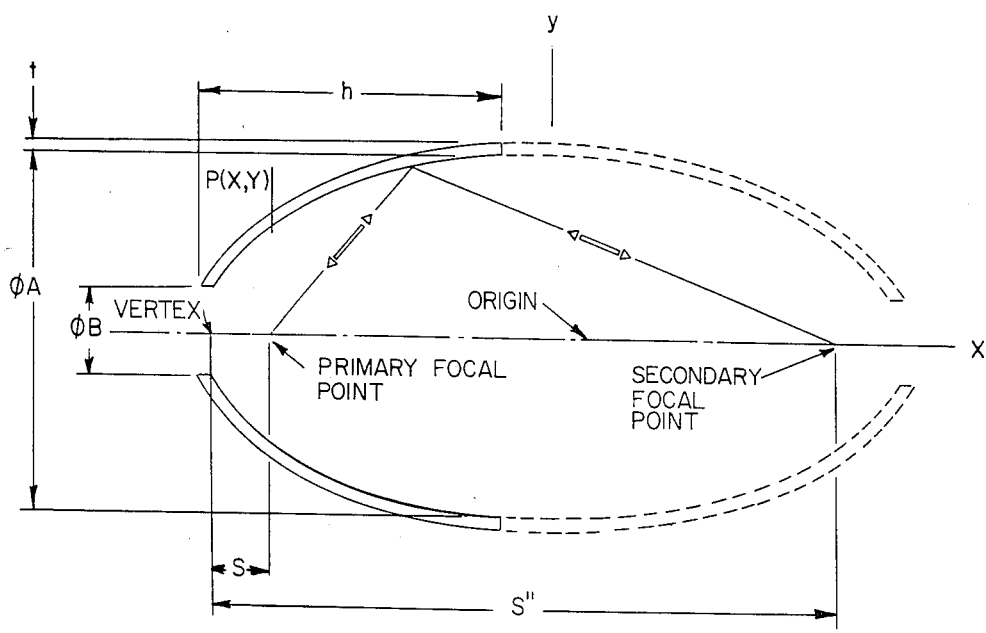
FIG. 2 is a schematic view of an ellipsoidal reflector system under the prior art.

This invention consists of three main components.

(1) Source. An optical point source of electromagnetic radiation. In the context of this invention, a point source is any compact source of electromagnetic radiation whose angular subtence is small. Typically, the linear angular size of such a source is no more than 0.1 radian. For example, a typical source may be an electric arc lamp with an arc gap of 2 mm placed in front of a spherical reflector at a distance of 5 cm. In the preferred embodiment this is a Mercury compact arc lamp with a one (1) mm arc length. However, any source of electromagnetic radiation which is small relative to the reflector's radius of curvature may be used.

(2) Reflector. The reflector focuses electromagnetic radiation from the source into the target. In the preferred embodiment, this is a portion of a spherical mirror concave relative to the source. The mirror may be exposed to optical preparations such as the first or second (inner) surface having been polished and coated with reflective material (e.g. aluminization).

(3) Target. The target is a small object which needs to be illuminated with the highest density electromagnetic radiation possible. In the preferred embodiment, it is a single core optic fiber with a diameter near 0.1 mm. Two other components which may be used as part of the invention include a magnetic field and correcting optics. The magnetic field is used in conjunction with a short arc lamp for compression of plasma in the arc discharge region to thereby reduce the effective size of the radiation source. Such a field may be created by a set of permanent magnets or by electromagnetic coils, such as Helmholtz coils. The correcting optics, shown by dashed lines as "C" in FIGS. 3a and 3b, may be used to correct optical distortions such as aberrations, astigmatism and coma that are associated with the off axis optical arrangement of the invention as is well known in the art.

FIGS. 3a and 3b show the placement of the source S and the reflector M according to the invention. FIGS.

3a and 3b also show the placement of correcting optics (shown by dashed lines at C) which are described below and well known in the art as a way to correct optical distortions caused by the off axis arrangement like aberrations, astigmatism and coma. The target is not shown, nor is the magnetic field generator, which could be used to compress the effective size of the source S.

Referring to FIGS. 3a and 3b, the reflector M has a radius of curvature r and is a portion of a sphere and is placed in a right handed orthogonal coordinate system (x, y, z) at a distance from the origin on the z axis where the z axis is the reflector's optical axis and an axis of symmetry. The concave surface of reflector M faces the origin and the reflector's center of curvature is at (0, 0, 0). Neither the cross-sectional shape nor the size of the reflector is of any significance. However, for simplicity the reflector is assumed to have a circular aperture of diameter A (where A is approximately equal to r) placed symmetrically about the z axis.

The source S, is at $(0, y_0, 0)$, displaced a distance $y_0$ from the optical axis. The source S is placed to illuminate the reflector M. Rays from the source, after being reflected by the concave mirror, will converge near $(0, -y_0, 0)$ creating the real image I of the source S.

As the source S is moved away from the axis of symmetry (z axis), the image quality deteriorates. As the distance $y_0$ between the source S and the origin increases so does the deterioration.

Figure 6:
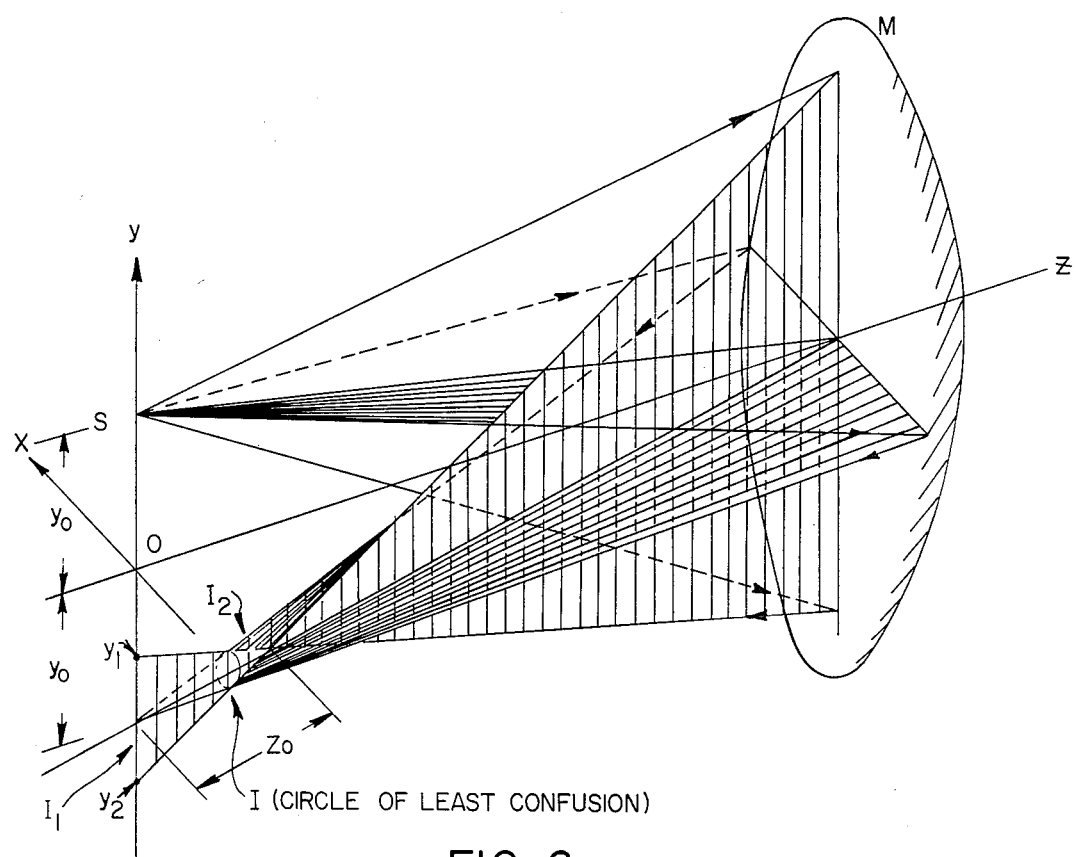
FIG. 6 is an enlarged view of the images $I_1$ and $I_2$ which are also depicted in FIGS. 3a, 3b and 4.

FIG. 4 is a ray tracing for the arrangement of FIGS. 3a and 3b with $y_0$ chosen to be relatively large for clarity. FIG. 4 shows that most of the rays first converge near $I_2$ at $(0, -y_0, z_0)$. The geometry is cylindrically symmetrical about the y axis as shown in FIG. 4. Therefore, a ray diagram for any plane (such as plane $\theta$ of FIG. 5), which contains the y axis, will be the same as the ray diagram of FIG. 4. All rays contained in the plane $\theta$ must intersect the y axis on the line from $y_1$ to $y_2$. Hence, the rays, emitted by source S and subsequently reflected by M, will also form a sharp line image $I_1$ on the y axis between $y_1$ and $y_2$ as can be seen in FIG. 6, and as seen in FIG. 5 will form another image $I_2$ along part of the circumference of a cylinder having radius $z_0$, which imaginary cylinder surrounds the y axis. This circular image is less sharp due to spherical aberrations.

At points between line images $I_1$ and $I_2$, the family of rays has an elliptical cross section. The major axis of the ellipse changes from the direction parallel to $I_2$ to the direction parallel to $I_1$, as the ellipse becomes a circle somewhere between the two line images. This circle is called a Circle of Least Confusion and designated by I in FIG. 6. The image I is considered to be the optimum image location in this invention, where a target should be placed, and is the subject of the quantitative analysis presented below.

Figure 7:
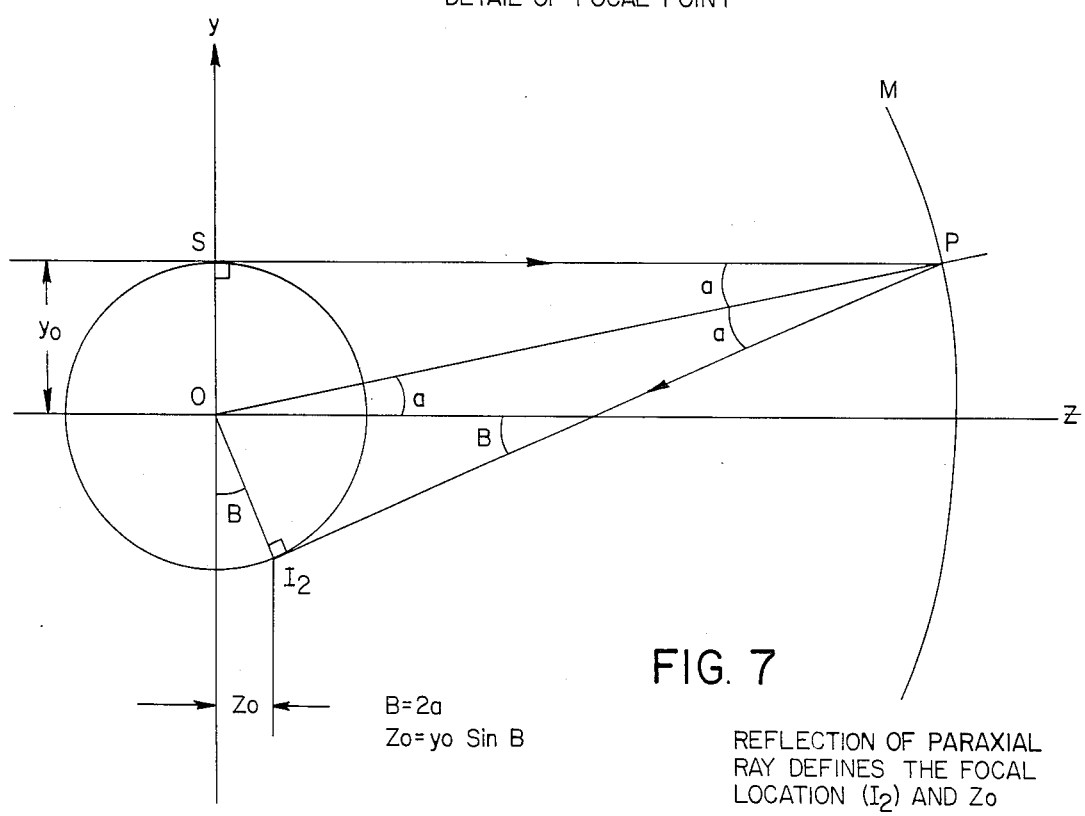
FIG. 7 is an enlarged view of FIG. 3a, in the form of a geometrical illustration.

FIG. 4 shows that most of the rays from the source S converge at $I_2$. This point can be defined as the point at which the para-axial ray SP after reflection intersects tangentially with a circle about the origin with radius $y_0$. FIG. 7 is a geometrical illustration of FIG. 4. In FIG. 7, line segment OP is normal to the reflector and therefore bisects angle $SPI_2$ according to the law of reflection. The angles a and b are shown on FIG. 7. From FIG. 7, it can be seen that $B=2a$; thus $$z_0 = y_0 \sin B$$
$$= y_0 \sin 2a$$
$$= 2 y_0 (\sin a)(\cos a).$$

$$\begin{bmatrix} \text{NOTE: } y_0 = y_0; \\ s_0 = s_0; z_0 = z_0; \\ \text{etc.} \end{bmatrix}$$

It is noted that $z_0$ is approximately equal to the absolute value of $(y_1-y_2)$ which is approximately equal to the arc length of $I_2$. See FIG. 6. It is also noted that $\sin a = y_0/r$, which quantity ($\sin a$) is much less than 1, and that $\cos a$ is approximately equal to 1. Thus $z_0$ is approximately equal to $2y^2_0/r$. Therefore:

$$z_0/2 \approx y_0^2/r \qquad \text{(``Equation 1'')}.$$

Therefore from FIG. 6, it can be seen that the circle of least confusion I is located approximately halfway between $I_1$ and $I_2$ or at approximately $(0, -y_0, z_0/2)$. Its diameter is approximately equal to $z_0/2$.

For a given spherical reflector M then, the smaller the off axis displacement $y_0$ of the source S, the smaller the spot size and the sharper the image. The same effect can be achieved albeit less effectively by increasing the radius of curvature r of the reflector M.

If an ideal point source is used and a cross sectional target of diameter d is to be illuminated with maximum flux density, then the circle of least confusion must be equal to or smaller than the target so that the target will capture most of the rays from the reflector. Thus, $$d \approx z_0/2 \approx y_0^2/r \qquad \text{(``Equation 2'')}$$

Adjusting $y_0$ or r to satisfy Equation 2 will optimize efficiency. In this case image spot size is dictated by the optics imaging capability.

If a source of finite size $s_0$ is used, then geometrical optics provides that it will be imaged with magnification equal to unity. However, every point on the image will be spread by $y_0^2/r$. This will blur the image. Improving the geometry to reduce $y_0^2/r$ has a limited effect on the image size beyond the point where $$y_0^2/r < s_0 \qquad \text{(``Equation 3'')}$$

This corresponds to the real life situation in which the system's ability to concentrate light on a small spot size is limited by the size of the point source rather than optical image distortions.

An example of an embodiment will be demonstrated. Suppose that one wishes to couple as much light flux as possible from an arc lamp into a small optical fiber. The lamp has an arc length (``$s_0$'') of 1 mm, typically ten times the length of the fiber's cross sectional diameter. If the radius of curvature r of the spherical reflector M is 50 mm then one may set $y_0=3$ mm to satisfy Equation 3 (i.e. the lamp is displaced 3 mm from the axis) then:

$$y^2_0/r = 3^2/50 = 9/50 = 0.18 \text{ mm} < 1 \text{ mm}$$

In this case, the ability to utilize the radiant flux, is determined by the target size as long as Equation 3 is satisfied. Increasing the target size will improve the coupling ability proportionally to the square of the diameter d until $d \approx s_0$. Alternatively, the source size $s_0$ could be reduced but a gain in flux density at the target would be achieved only if the source's radiative flux output is not reduced at the same time.

The following four approaches can be used to produce a small spot size without losing radiative flux density.

(1) Use the system in the regime where Equation 2 or 3 is satisfied so that optical distortion will be negligible when compared to the target and source sizes.

(2) Use correcting optics, well known in the art, before the target as shown in FIGS. 3a and 3b to form an ideal image by cancelling off axis distortions.

Figure 8:
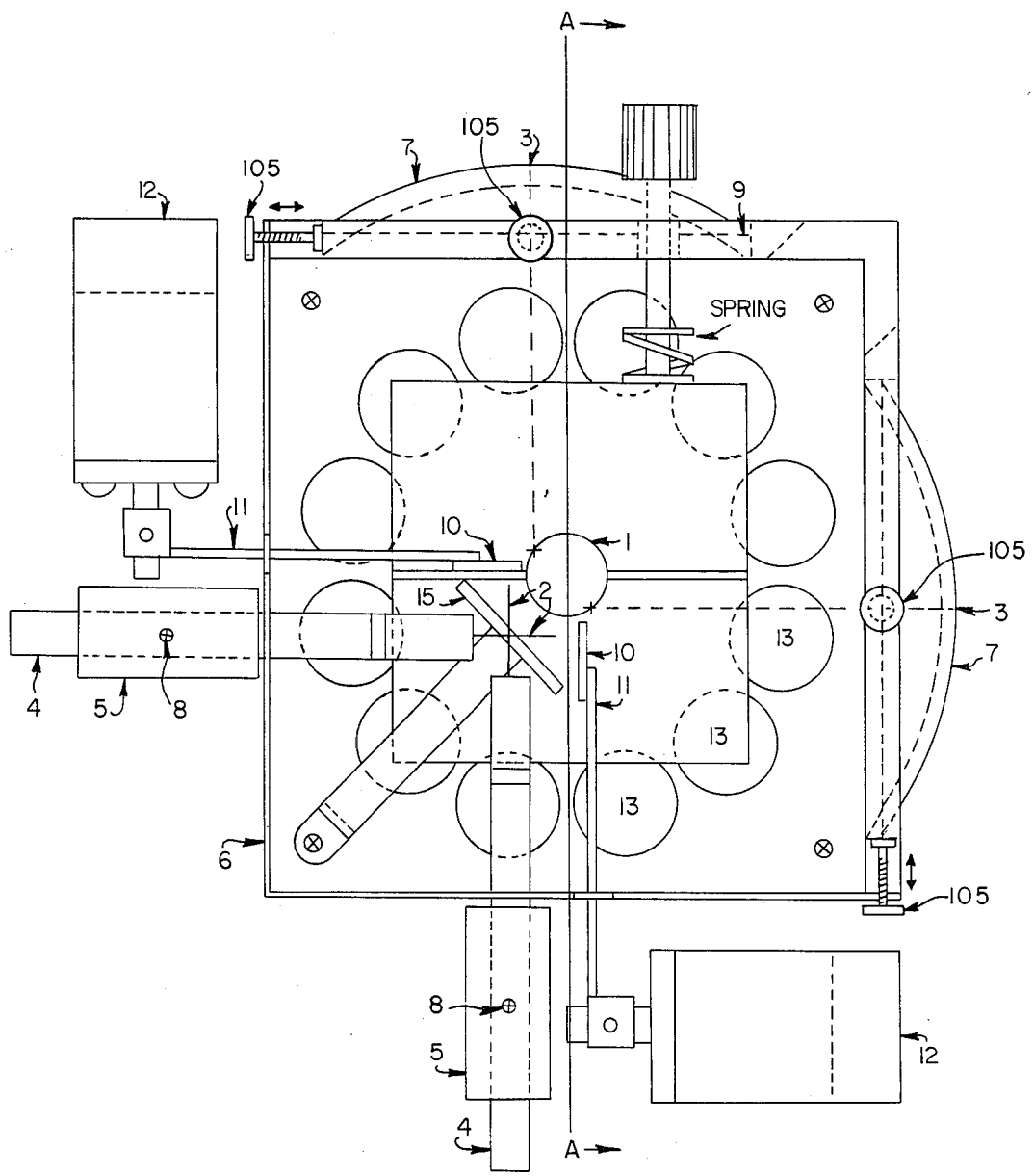
FIG. 8 is a top elevational view of a preferred embodiment of the invention in which one source illuminates two targets.

(3) Deform the spherical reflector to make it ellipsoidal with low eccentricity. If the sperical reflector is made from a semiflexible material like thin metal or glass, it can be mounted in a fixture (e.g. a vise) that will compress or elongate it in one direction. FIG. 8 shows a means 105 for deforming a reflector; the means 105 may be a thumbscrew which may be turned to deform the reflector. The reflector can be deformed to have an appropriate eccentricity so that one of the foci will coincide where the source S is located and the image will be produced at the complimentary focus.

(4) Reduce the source spot size $s_0$. With an arc lamp, reducing the electrode gap does not necessarily reduce the arc volume. The repulsive forces between the ions cause the plasma to expand. This can be overcome by placing a magnetic field parallel to the electrodes. The plasma can be pinched into the narrow area between the electrodes and the light flux density is maintained. Permanent magnets or electromagnetic coils, for example Helmholtz coils which are well known in the art, can be used.

DESCRIPTION OF THE PREFERRED EMBODIMENT

Figure 9:
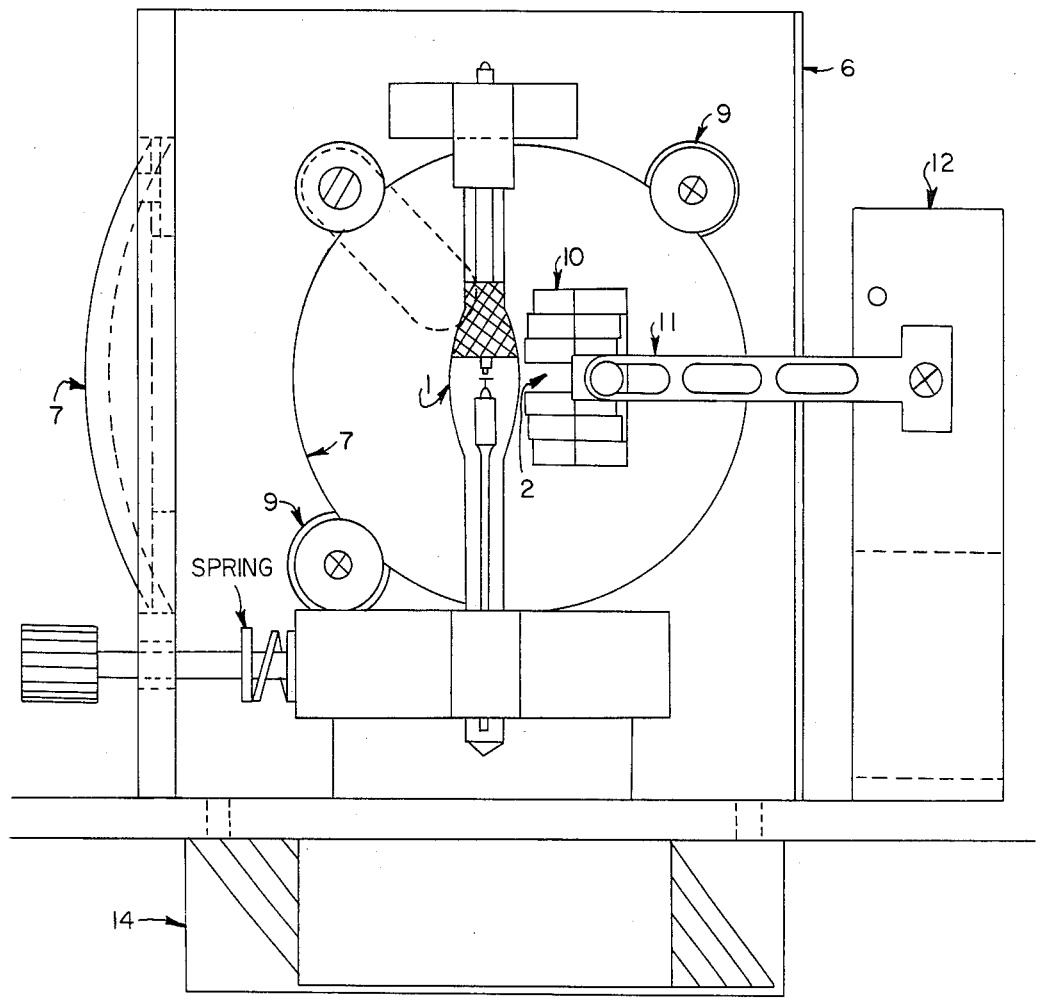
FIG. 9 is a side cross sectional view of the embodiment of FIG. 8 through the line AA.

FIGS. 8 and 9 shows an application of the invention. The figures are illustrative not limitative. In FIGS. 8 and 9 a single arc lamp 1 illuminates two optic fibers 2 through the use of two reflectors 7 which have optical axes shown by dashed lines labelled 3. The optic fibers are set in mounts 4 which are set in fixtures 5 outside the lamp housing assembly 6. The fixtures 5 include set screws 8 so that the position of the optic fibers 2 can be adjusted. In FIG. 9 the positioning of the reflectors 7 can be adjusted by turning finger screws 9.

This embodiment also features a pair of dichroic filter element assemblies 10 which are placed between the optic fibers 2 and the reflectors 7. The dichroic filter element assemblies 10, for color filtering, are mounted on pivoting arms 11 which are controlled by electromagnetic actuators 12. This arrangement allows quick remote selection of dichroic filter elements. This changes the color of light entering the fiber. Correcting optics which are not shown can be incorporated into the space between the dichroic element assemblies 10 and the spherical reflector 7, as is well known in the art.

The heat produced by the lamp 1 is compensated for by vent holes 13 in the bottom of the lamp housing assembly 6 which lead to a fan 14. The sensitive optic fibers 2 and their mounts 4 are protected from the heat by a baffle 15 between the lamp 1 and the mounts 4 through which the fibers 2 pass.

We claim:

1. An electromagnetic radiation collecting and condensing illumination system for providing a high intensity light source having as much radiation flux as possible in a small area, said system comprising:
    a concave electromagnetic radiation reflector having an optical axis;
    an electromagnetic radiation source located near the center of curvature of said reflector but offset a first distance from the optical axis of said reflector so as to produce a substantially focused image of said source upon reflection from said reflector offset from said axis by a distance substantially equal to said first distance; and
    a target placed near said image to collect said electromagnetic radiation.

2. The collecting and condensing system of claim 1 wherein a correcting optics system is placed between said target and said reflector to improve the focus of said image on said target.

3. The collecting and condensing system of claim 2 further comprising a means for deforming the shape of the reflector being coupled to the reflector.

4. An electromagnetic radiation collecting and condensing illumination system for providing a high intensity light source having a large radiation flux in a small area, said system comprising:
    an electromagnetic radiation reflector, said reflector having a shape substantially like that of a portion of a sphere;
    an electromagnetic radiation source, said source being at a location offset a first distance perpendicular to an axis of symmetry which is normal to said reflector so that said source produces a substantially focused image of said source upon reflection which is offset from said axis by a distance substantially equal to said first distance; and
    a target placed near said image to collect said electromagnetic radiation.

5. The collecting and condensing system of claim 4 wherein a correcting optics system is placed between said target and said reflector to improve the focus of said image on said target.

6. The collecting and condensing system of claim 4 further comprising a means for deforming the shape of the reflector being coupled to the reflector.

7. A light collecting and condensing illumination system for providing a high intensity light source having a large radiation flux in a small area, said system comprising:
    a mirror having a shape substantially like that of a portion of a sphere and having an axis of symmetry;
    an arc lamp located near the center of curvature of said mirror but offset a first distance from said mirror's axis of symmetry so as produce a substantially focused image of said lamp offset from said axis by a distance substantially equal to said first distance; and
    an optic fiber placed near said image to collect said light.

8. The collecting and condensing system of claim 7 wherein a correcting optics system is placed between said mirror and said optic fiber to improve the focus of said image on said optic fiber.

9. The collecting and condensing system of claim 7 further comprising a means for deforming the shape of the reflector being coupled to the reflector to improve the focus of said image on said optic fiber.

* * * * *